(12) United States Patent
Zhuo et al.

(10) Patent No.: US 11,181,288 B2
(45) Date of Patent: Nov. 23, 2021

(54) COMFORT DEGREE BALANCE CONTROL METHOD AND SYSTEM FOR MULTI-SPLIT AIR CONDITIONER

(71) Applicant: QINGDAO HAIER AIR-CONDITIONING ELECTRONIC CO., LTD, Qingdao (CN)

(72) Inventors: Baitian Zhuo, Qingdao (CN); Bin Shi, Qingdao (CN); Shaojiang Cheng, Qingdao (CN); Ruigang Zhang, Qingdao (CN); Jun Wang, Qingdao (CN)

(73) Assignee: QINGDAO HAIER AIR-CONDITIONING ELECTRONIC CO., LTD., Qingdao (CN)

( * ) Notice: Subject to any disclaimer, the term of this patent is extended or adjusted under 35 U.S.C. 154(b) by 0 days.

(21) Appl. No.: 16/639,372

(22) PCT Filed: Jul. 19, 2018

(86) PCT No.: PCT/CN2018/096283
§ 371 (c)(1),
(2) Date: Feb. 14, 2020

(87) PCT Pub. No.: WO2019/056844
PCT Pub. Date: Mar. 28, 2019

(65) Prior Publication Data
US 2020/0256573 A1    Aug. 13, 2020

(30) Foreign Application Priority Data

Sep. 19, 2017 (CN) .......................... 201710851713.2

(51) Int. Cl.
*F24F 11/30* (2018.01)
*F24F 11/62* (2018.01)
(Continued)

(52) U.S. Cl.
CPC ............ *F24F 11/30* (2018.01); *F24F 1/0003* (2013.01); *F24F 11/56* (2018.01); *F24F 11/62* (2018.01);
(Continued)

(58) Field of Classification Search
CPC .............................. F24F 11/83; F24F 2110/10
See application file for complete search history.

(56) References Cited

U.S. PATENT DOCUMENTS

2009/0306828 A1* 12/2009 Larsen ..................... F24F 11/30
                                                                700/276
2014/0229016 A1    8/2014 Shiflet
(Continued)

FOREIGN PATENT DOCUMENTS

| CN | 105091204 | 11/2015 |
|----|-----------|---------|
| CN | 107166647 | 9/2017 |

*Primary Examiner* — Nathan L Laughlin
(74) *Attorney, Agent, or Firm* — Jiwen Chen; Jacobson Holman PLLC (57) ABSTRACT

A comfort degree balance control system and method for multi-split air conditioner disclosed the present invention includes: obtaining a real-time ambient temperature and a target ambient temperature of each of rooms where an indoor unit provided is working; calculating a comfort degree deviation of each of the working indoor units; obtaining the maximum value offsetMAX and the minimum value offsetMIN among the comfort degree deviations of indoor units and calculating the difference Δ=offsetMAX−offsetMIN between the two; calculating an average comfort degree deviation; adjusting the amount of refrigerant flowing into working indoor units according to the difference Δ

(Continued)

and the average comfort degree deviation, so as to reduce the difference $\Delta$ and balance the performance of the multi-split system.

10 Claims, 3 Drawing Sheets

(51) Int. Cl.
    *F24F 11/64*     (2018.01)
    *F24F 11/65*     (2018.01)
    *F24F 11/83*     (2018.01)
    *F24F 11/56*     (2018.01)
    *F24F 1/0003*     (2019.01)
    *G05B 17/02*     (2006.01)
    *F24F 120/12*     (2018.01)
    *F24F 110/10*     (2018.01)
    *F24F 110/12*     (2018.01)
    *F24F 140/20*     (2018.01)

(52) U.S. Cl.
    CPC .............. *F24F 11/64* (2018.01); *F24F 11/65* (2018.01); *F24F 11/83* (2018.01); *G05B 17/02* (2013.01); *F24F 2110/10* (2018.01); *F24F 2110/12* (2018.01); *F24F 2120/12* (2018.01); *F24F 2140/20* (2018.01)

(56) References Cited

U.S. PATENT DOCUMENTS

2015/0032269 A1*   1/2015   Nishimiya ............... F24F 11/30
                                                                                                                    700/278
2020/0292199 A1*   9/2020   Jiao ........................ F25B 31/002
2020/0355416 A1*   11/2020   Jia ............................ F24F 11/64

* cited by examiner

COMFORT DEGREE BALANCE CONTROL METHOD AND SYSTEM FOR MULTI-SPLIT AIR CONDITIONER

The present application is based on and claims priority from Chinese Patent Application No. 201710851713.2, filed Sep. 19, 2017, the disclosure and content of the application is incorporated by reference herein.

FIELD OF THE INVENTION

The present disclosure relates to the technical field of air conditioning, and in particular, relates to a comfort degree balance control method and a control system for multi-split air conditioner.

BACKGROUND

A typical multi-split air conditioner has an outdoor unit and a plurality of indoor units connected thereto wherein each of the indoor unit is provided with an expansion valve configured to adjust the amount of refrigerant flowing into, so as to exchange heat with the outside environment. The opening degree of each of the expansion valves depends on a target parameter which is being adjusted in operation, such as coil temperature of indoor heat exchanger. In cooling operation, the lower the target parameter is, the more refrigerant required to flow into indoor heat exchanger; in heating operation, the higher the target parameter is, the more refrigerant required to flow into indoor heat exchanger.

Typically, the target parameter is preset according to the capacity of each of the indoor unit, and that is to say under an unchanged working environment the target parameter could not be adjusted flexibly, such that the refrigerant being distributed into each of the indoor units is constant. However, because the target temperatures of rooms where the indoor units are provided are related to the ambient and the target temperatures of different rooms may vary, the constant distribution of refrigerant for indoor units and varied target temperatures may lead to a problem that in some of the rooms the temperature has reached to the target temperature while in other rooms the temperatures are far from the target temperature, which could not enable every individual room to reach to a same comfort level.

SUMMARY OF THE INVENTION

The present invention provides a comfort degree balance control method for multi-split air conditioner configured to balance the performance of multi-split air conditioner.

In order to solve the above technical problems, the present invention is implemented by the following technical solutions:

A comfort degree balance control method for multi-split air conditioner includes:

1) obtaining a real-time ambient temperature and a target ambient temperature of each of rooms where an indoor unit provided is working, and calculating a comfort degree deviation of each of the working indoor units; in which each of the comfort degree deviations is calculated by:

in cooling operation:

$$offset_i = (curTemp_i - setTemp_i) * 100 / setTemp_i;$$

in heating operation:

$$offset_i = (setTemp_i - curTemp_i) * 100 / setTemp_i;$$

wherein $offset_i$ denoting the comfort degree deviation of working indoor unit i; $curTemp_i$ denoting the real-time ambient temperature of working indoor unit i; and $setTemp_i$ denoting the target ambient temperature of working indoor unit i; i=1, 2, 3, ..., N; N denoting the number of indoor units that are working;

2) Obtaining the maximum value offsetMAX and the minimum value offsetMIN among the comfort degree deviations of working indoor units and calculating the difference Δ=offsetMAX−offsetMIN between the two;

3) Calculating an average comfort degree deviation $$offsetAVG = \left(\sum_{i=1}^{N}(offset_i * HP_i)\right) / SumHP;$$

wherein $HP_i$ denoting the capacity of i-th working indoor unit and SumHP denoting the sum of capacities of working indoor units;

4) adjusting the amount of refrigerant flowing into working indoor units according to the difference Δ and the average comfort degree deviation.

Further, adjusting the amount of refrigerant flowing into indoor units according to the difference Δ and the average comfort degree deviation, including:

(41) if the difference Δ>a first set threshold:

for an indoor unit with a comfort degree deviation>(offsetAVG+a second set threshold), increasing refrigerant flowing into the indoor unit;

for an indoor unit with a comfort degree deviation<(offsetAVG−the second set threshold), reducing refrigerant flowing into the indoor unit;

for an indoor unit with a comfort degree deviation satisfying (offsetAVG−the second set threshold)≤the comfort degree deviation≤(offsetAVG+the second set threshold), keeping the amount of refrigerant flowing into the indoor unit unchanged;

(42) if the second set threshold<the difference Δ≤the first set threshold:

for an indoor unit with a comfort degree deviation>0, increasing refrigerant flowing into the indoor unit;

for an indoor unit with a comfort degree deviation<0, reducing refrigerant flowing into the indoor unit;

for an indoor unit with a comfort degree deviation=0, keeping the amount of refrigerant flowing into the indoor unit unchanged;

(43) if the difference Δ≤the second set threshold, keeping refrigerant flowing into each of working indoor units unchanged;

wherein the first set threshold>the second set threshold>0.

Further, in step (41)

if the difference Δ>the first set threshold, the amount of refrigerant flowing into indoor units is being increased or decreased by adjusting coil temperature target value of heat exchangers within indoor units:

for an indoor unit with a comfort degree deviation>(offsetAVG+the second set threshold), a coil temperature target value being calculated by:

in cooling operation:

$$paraCtlTar = paraCtlCur - (offset - offsetAVG - the\ second\ set\ threshold) * ratioA;$$

in heating operation:

$$paraCtlTar = paraCtlCur + (offset - offsetAVG - the\ second\ set\ threshold) * ratioA;$$

for an indoor unit with a comfort degree deviation<(offsetAVG−the second set threshold), a coil temperature target value being calculated by:

in cooling operation:

$$paraCtlTar=paraCtlCur+(offsetAVG-\text{the second set threshold}-offset)*rationA;$$

in heating operation:

$$paraCtlTar=paraCtlCur-(offsetAVG-\text{the second set threshold}-offset)*rationA;$$

wherein paraCtlTar denotes the coil temperature target value, paraCtlCur denotes a real-time coil temperature, offset is the comfort degree deviation of the indoor unit and rationA is the adjustment coefficient.

Further, in step (42), if the second set threshold value<the difference $\Delta \leq$ the first set threshold value, the amount of refrigerant flowing into indoor units is increased or decreased by adjusting coil temperature target value of heat exchanger of indoor unit;

in cooling operation: $paraCtlTar=paraCtlCur-offset*rationB;$ in heating operation: $paraCtlTar=paraCtlCur+offset*rationB;$ wherein paraCtlTar denotes the coil temperature target value, paraCtlCur denotes a real-time coil temperature, offset is the comfort degree deviation of the indoor unit, and rationB is the adjustment coefficient.

Preferably, rationB<rationA.

Preferably, rationA belongs to [0.6, 1].

Preferably, rationB belongs to [0.1, 0.5].

Another aspect of the present invention is to provide a comfort degree balance control system for multi-split air conditioner includes:

an acquisition module configured to obtain a real-time ambient temperature and a target ambient temperature of each of rooms where an indoor unit provided in working;

a comfort degree deviation calculation configured to calculate a comfort degree deviation of each of the working indoor units which is calculated by:

in cooling operation, $$offseti=(curTempi-setTempi)*100/setTempi;$$

in heating operation, $$offseti=(setTempi-curTempi)*100/setTempi;$$

wherein, $offset_i$ denotes the comfort degree deviation of working indoor unit i; curTempi denotes the real-time ambient temperature of working indoor unit i; and setTempi denotes the target ambient temperature of working indoor unit i; where i=1, 2, 3, . . . , N; N is the number of indoor units that are working;

a difference calculation module configured to obtain a maximum value offsetMAX and a minimum value offsetMIN among the comfort degree deviations of working indoor units and calculate a difference $\Delta$=offsetMAX−offsetMIN therebetween;

an average comfort degree deviation calculation module configured to calculate an average comfort degree deviation $$offsetAVG = \left(\sum_{i=1}^{N}(offset_i * HP_i)\right)/SumHP,$$

wherein HPi denotes the capacity of i-th working indoor unit; SumHP denotes the sum of capacities of working indoor units; and an adjustment module configured to adjust the amount of refrigerant flowing into indoor units according to the difference $\Delta$ and the average comfort degree deviation.

Further, the adjustment module configured to:

if the difference $\Delta$>the first set threshold:

for an indoor unit with a comfort degree deviation>(offsetAVG+the second set threshold), to increase the amount of refrigerant flowing into the indoor unit;

for an indoor unit with a comfort degree deviation<(offsetAVG−the second set threshold), to reduce the amount of refrigerant flowing into the indoor unit;

for an indoor unit with a comfort degree deviation satisfying (offsetAVG−the second set threshold)$\leq$the comfort degree deviation$\leq$(offsetAVG+the second set threshold), to keep the amount of refrigerant flowing into the indoor unit unchanged;

if the second set threshold value<difference $\Delta \leq$the first set threshold value;

for an indoor unit with a comfort degree deviation>0, to increase the amount of refrigerant flowing into the indoor unit;

for an indoor unit with a comfort degree deviation<0, to reduce the amount of refrigerant flowing into the indoor unit;

for an indoor unit with a comfort degree deviation=0, to keep the amount of refrigerant flowing into the indoor unit unchanged;

if the difference $\Delta \leq$the second set threshold, to keep the amount of refrigerant flowing into the indoor unit unchanged;

wherein the first set threshold>the second set threshold>0.

Further, the adjustment module configured to:

adjust coil temperature target value of indoor unit heat exchanger by increasing or decreasing the amount of refrigerant flowing into the indoor unit if the difference $\Delta$>the first set threshold; for an indoor unit with a comfort degree deviation>(offsetAVG+the second set threshold), a coil temperature target value being calculated by:

in cooling operation:

$$paraCtlTar=paraCtlCur-(offset-offsetAVG-\text{the second set threshold})*rationA;$$

in heating operation:

$$paraCtlTar=paraCtlCur+(offset-offsetAVG-\text{the second set threshold})*rationA;$$

for an indoor unit with a comfort degree deviation<(offsetAVG−a second set threshold), a coil temperature target value is being calculated by:

in cooling operation:

$$paraCtlTar=paraCtlCur+(offsetAVG-\text{the second set threshold}-offset)*rationA;$$

in heating operation:

$$paraCtlTar=paraCtlCur-(offsetAVG-\text{the second set threshold}-offset)*rationA;$$

adjust coil temperature target value of indoor unit heat exchanger by increasing or decreasing the amount of refrigerant flowing into indoor unit if the second set threshold value<difference $\Delta \leq$the first set threshold value, wherein a coil temperature target value being calculated by:

in cooling operation:

$$paraCtlTar=paraCtlCur-offset*rationB;$$

in heating operation:

$$paraCtlTar=paraCtlCur+offset*rationB;$$

wherein paraCtlTar denotes the coil temperature target value, paraCtlCur denotes a real-time coil temperature, offset is the comfort degree deviation of the indoor unit, and rationA and rationB are adjustment coefficients.

In general, the comfort degree balance control method and control system for multi-split air conditioner disclosed the present invention includes: obtaining a real-time ambient temperature and a target ambient temperature of each of rooms where an indoor unit provided is working; calculating a comfort degree deviation of each of the working indoor units; obtaining the maximum value offsetMAX and the minimum value offsetMIN among the comfort degree deviations of working indoor units and calculating the difference Δ=offsetMAX−offsetMIN between the two; calculating an average comfort degree deviation; adjusting the amount of refrigerant flowing into working indoor units according to the difference Δ and the average comfort degree deviation, so as to reduce the difference Δ and balance the performance of the multi-split system.

Other features and advantages of the present invention will become apparent by reading embodiments accompanying the drawings.

DESCRIPTION OF EMBODIMENTS

Hereinafter, embodiments of a comfort degree balance control method, and a comfort degree balance control system for multi-split air conditioner according to the present disclosure will be described with reference to the drawings.

Figure 1:
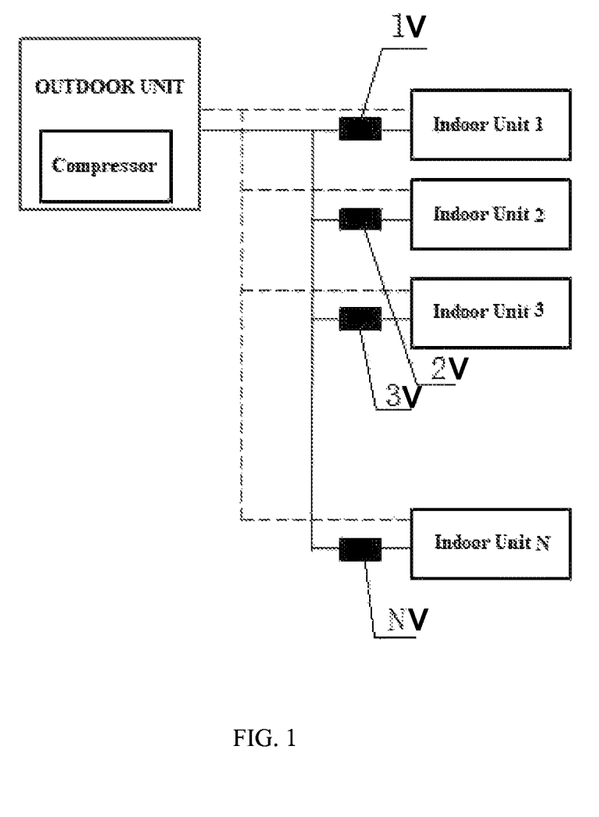
FIG. 1 is a schematic view of a refrigerant circuit of a multi-split air conditioning system according to the present disclosure.

An embodiment of the present disclosure will be described with reference to FIG. 1. FIG. 1 schematically illustrates a refrigerant circuit of a multi-split air conditioning system according to the present embodiment. In the multi-split air conditioner, an outdoor unit is respectively connected to a plurality of indoor units, wherein between the outdoor unit and each of the indoor unit an expansion valve is disposed. The expansion valve is preferably arranged on a liquid-side piping of the indoor unit so as to adjust the amount of refrigerant flowing into. The liquid-side pipes of each of the indoor units are connected to the liquid-side pipe of the outdoor unit. As an example, the liquid piping of an indoor unit 1 is provided with an expansion valve V1, the liquid piping of an indoor unit 2 is provided with an expansion valve V2, the liquid piping of an indoor unit 3 is provided with an expansion valve V3, . . . , the liquid piping of an indoor unit N is provided with an expansion valve VN.

Figure 2:
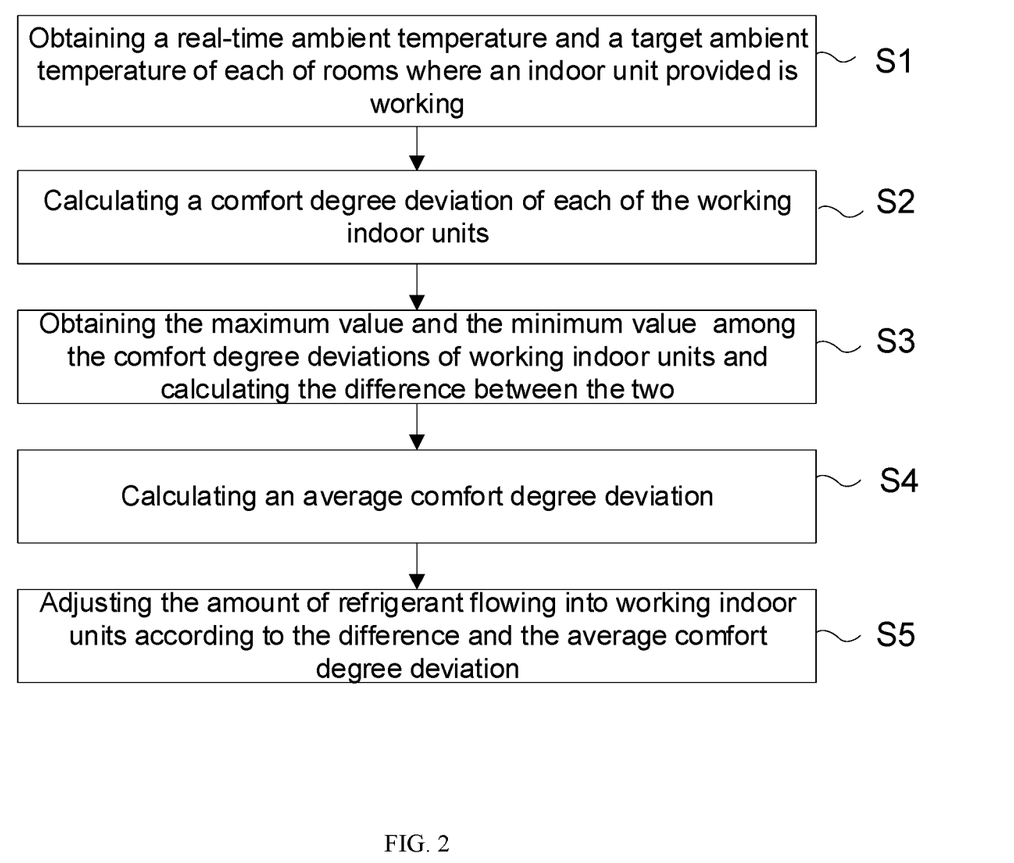
FIG. 2 is a flow chart of a comfort degree balance control method according to the present disclosure.

A comfort degree balance control method according to the present disclosure comprises the following steps, as shown in FIG. 2.

Performing steps as follows every set time (as an example, the set time could be 10 minutes):

Step S1: Obtaining a real-time ambient temperature and a target ambient temperature of each of rooms where an indoor unit provided is working.

Step S2: Calculating a comfort degree deviation of each of the working indoor units.

Each of the comfort degree deviations is calculated by:

In cooling operation: $\text{offset}_i = (\text{curTemp}_i - \text{setTemp}_i) * 100 / \text{setTemp}_i$;

In heating operation: $\text{offset}_i = (\text{setTemp}_i - \text{curTemp}_i) * 100 / \text{setTemp}_i$;

Wherein, $\text{offset}_i$ denotes the comfort degree deviation of working indoor unit i, which is expressed as a percentage %; curTempi denotes the real-time ambient temperature of working indoor unit i; and setTempi denotes the target ambient temperature of working indoor unit i; i=1, 2, 3, . . . , N; N is the number of indoor units that are working.

The deviation of comfort is the deviation of the indoor unit from the ideal state, that is, the deviation of the current actual ambient temperature from the target ambient temperature, that is, the deviation between the actual value and the theoretical value. The closer the deviation is to 0, the closer the comfort level is to the ideal state. The ideal state of the indoor unit is that the actual ambient temperature reaches the target ambient temperature.

Specifically, the actual ambient temperature of the first working indoor unit is curTemp1, the target ambient temperature is setTemp1, and the comfort degree deviation is offset1; the actual ambient temperature of the second working indoor unit is curTemp2, and the target ambient temperature is setTemp2. The comfort degree deviation is offset2; the actual ambient temperature of the third working indoor unit is curTemp3, the target ambient temperature is setTemp3, and the comfort degree deviation is offset3; . . . ; the actual ambient temperature of the Nth working indoor unit is curTempN, the target ambient temperature is setTempN and the comfort degree deviation is offsetN.

If offseti=0, it means that the actual ambient temperature of the room where the i-th working indoor unit in reaches the target ambient temperature and meets the user's demand; if the offseti is greater than 0, it means that the performance of i-th working indoor unit falls below the required cooling or heating effect; if the offseti is less than 0, it indicates that the performance of i-th working indoor unit goes beyond the required cooling and heating effect.

Step S3: Obtaining the maximum value offsetMAX and the minimum value offsetMIN among the comfort degree deviations of indoor units and calculating the difference Δ=offsetMAX−offsetMIN between the two.

That is to say, finding the maximum and minimum values in offset1, offset2, offset3, . . . , offsetN and calculating the difference between the two.

Step S4: Calculating an average comfort degree deviation $$\text{offsetAVG} = \left( \sum_{i=1}^{N} (\text{offset}_i * HP_i) \right) / \text{SumHP}$$

Wherein HPi denotes the capacity of i-th working indoor unit; SumHP denotes the sum of capacities of all working indoor units, $$\text{SumHP} = \sum_{i=1}^{N} HP_i,$$

i=1, 2, 3, . . . , N; N is the number of working indoor units.

The capacity of each of indoor units is relevant to environmental factors, such as the space of the room. The calculation of the average comfort degree deviation takes the capacity of indoor unit into consideration.

Step S5: Adjusting the amount of refrigerant flowing into working indoor units according to the difference Δ and the average comfort degree deviation.

If the difference Δ is comparatively high, it indicates the situation that the comfort degree deviation of all working indoor units is large and the performance of the multi-split system is unbalanced, so the amount of refrigerant flowing into working indoor units could be adjusted according to the difference between the comfort degree deviation and the average comfort degree deviation to reduce the difference Δ and balance the performance of the multi-split system.

In general, the comfort degree balance control method disclosed the embodiment includes: obtaining a real-time ambient temperature and a target ambient temperature of each of rooms where an indoor unit provided is working; calculating a comfort degree deviation of each of the working indoor units; obtaining the maximum value offsetMAX and the minimum value offsetMIN among the comfort degree deviations of indoor units and calculating the difference Δ=offsetMAX−offsetMIN between the two; calculating an average comfort degree deviation; adjusting the amount of refrigerant flowing into working indoor units according to the difference Δ and the average comfort degree deviation, so as to reduce the difference Δ and balance the performance of the multi-split system.

The comfort degree balance control method disclosed by the embodiment reduces the difference Δ by adjusting the refrigerant flowing into of the indoor unit so as to fill in the gap among comfort degree deviations of indoor units and balance air conditioning performance in each of the rooms where indoor units in, thereby ensuring each of the rooms has a same comfort level and indoor units reach its ideal state at the same time and enhancing the comfort uniformity of multi-split system.

Typically, the adjustment of the amount of refrigerant flowing into indoor units is fulfilled by adjusting the opening degree of expansion valves according to coil temperatures of heat exchangers. That is to say, in order to adjust the amount of refrigerant flowing into each of indoor units, it should adjust the target value of coil temperature of corresponding indoor unit, namely using the target coil temperature of the indoor unit as the indoor unit target parameter. Accordingly, if the target parameter is being adjusted, the refrigerant flowing into indoor units could be distributed again so as to balance the comfort performance of indoor units to a substantially same level.

Adjusting the amount of refrigerant flowing into indoor units according to the difference Δ and the average comfort degree deviation, including the following steps:

1. if the difference Δ>a first set threshold, it means that the comfort degree difference among working indoor units is evident and the performance of the multi-split system is poor. In order to balance the comfort level of the multi-split system, the amount of refrigerant flowing into indoor units should be adjusted; wherein the first set threshold is >0, such as the first set threshold=10.

The refrigerant amount flowing of indoor unit is increased or decreased by adjusting the coil temperature target value of heat exchangers within the indoor unit.

(1) For an indoor unit with a comfort degree deviation> (offsetAVG+a second set threshold), it means its comfort degree deviation is far from an ideal state. In order to balance the overall performance of the multi-split system, it is necessary to increase the refrigerant flowing into the indoor unit so as to improve cooling or heating effect.

In cooling operation, the lower the coil temperature target value, the larger the expansion valve opening degree, the larger the refrigerant amount flowing into, and a coil temperature target value is calculated by:

$$paraCtlTar = paraCtlCur - (offset - offsetAVG - \text{the second set threshold})*rationA.$$

In heating operation, the higher the coil temperature target value, the larger the expansion valve opening degree, the larger the refrigerant amount flowing into, and the coil temperature target value is calculated by:

$$paraCtlTar = paraCtlCur + (offset - offsetAVG - \text{the second set threshold})*rationA.$$

Wherein, paraCtlTar denotes the coil temperature target value, paraCtlCur denotes a real-time coil temperature as the expansion valve of an indoor unit is being adjusted, offset is the comfort degree deviation of the indoor unit, and rationA is an adjustment coefficient, which can be determined via experiments; wherein the first set threshold>the second set threshold>0.

That is to say, the difference between offset and (offsetAVG+the second set threshold) is taken as the decrement (in cooling operation) or increment (in heating operation) of the coil temperature target value to increase the expansion valve opening degree and increase the amount of refrigerant flowing into so as to reduce the comfort degree deviation of the indoor unit and balance the performance of multi-split system.

(2) For an indoor unit with a comfort degree deviation< (offsetAVG−the second set threshold), it means its comfort degree deviation is low and close to an ideal state. In order to balance the overall performance of the multi-split system, it is necessary to reduce the refrigerant flowing into the indoor unit so as to increase the amount flowing of refrigerant into other indoor units far from the ideal state.

In cooling operation, the higher the coil temperature target value, the smaller the expansion valve opening degree, the smaller the refrigerant amount flowing into, and a coil temperature target value is calculated by:

$$paraCtlTar = paraCtlCur + (offsetAVG - \text{the second set threshold} - offset)*rationA;$$

In heating operation, the lower the coil temperature target value, the smaller the expansion valve opening degree, the smaller the refrigerant amount flowing into, and the coil temperature target value is calculated by:

$$paraCtlTar = paraCtlCur - (offsetAVG - \text{the second set threshold} - offset)*rationA.$$

Wherein paraCtlTar denotes the coil temperature target value, paraCtlCur denotes a real-time coil temperature, offset is the comfort degree deviation of the indoor unit, and rationA is the adjustment coefficient.

That is to say, the difference between (offsetAVG−the second set threshold) and offset is taken as the increment (in cooling operation) or decrement (in heating operation) of the coil temperature target value to reduce the expansion valve opening degree and decrease the amount of refrigerant flowing into so as to increase the comfort degree deviation of the indoor unit and balance the performance of multi-split system.

(3) For an indoor unit with a comfort degree deviation satisfying (offsetAVG−the second set threshold)≤the comfort degree deviation≤(offsetAVG+the second set threshold), the comfort degree deviation is at a medium level among indoor units of the multi-split system, and the amount of refrigerant flowing into of the indoor unit is kept constant, that is to keep the coil temperature target value unchanged.

2. if the second set threshold<the difference Δ≤the first set threshold, it means that the comfort degree difference among working indoor units is not apparent and the performance of certain indoor units may go beyond the ideal state, and accordingly the performance of indoor units which do not meet the requirements could be improved appropriately on the premise of keeping the performance of the multi-split balanced.

(1) For an indoor unit with a comfort degree deviation>0, the amount of refrigerant flowing into the indoor unit is increased to reduce the comfort degree deviation and balance the overall performance of the multi-split system.

(2) For an indoor unit with a comfort degree deviation<0, the amount of refrigerant flowing into the indoor unit is reduced to increase the comfort degree deviation and balance the overall performance of the multi-split system.

(3) For an indoor unit with a comfort degree deviation=0, the amount of refrigerant flowing into the indoor unit is kept constant, so that the comfort degree deviation is kept constant to balance the overall performance of the multi-split system.

The refrigerant amount flowing into indoor units is increased or decreased by adjusting the coil temperature target value of the heat exchanger of the indoor unit.

In this embodiment, if the second set threshold value<the difference Δ≤the first set threshold value, and a coil temperature target value is calculated by:

In cooling operation: paraCtlTar=paraCtlCur−offset*rationB;

In heating operation: paraCtlTar=paraCtlCur+offset*rationB;

Wherein paraCtlTar denotes the coil temperature target value, paraCtlCur denotes a real-time coil temperature, offset is the comfort degree deviation of the indoor unit, and rationB is the adjustment coefficient.

To be specific:

(1) For an indoor unit with offset>0,

In cooling operation, if paraCtlTar<paraCtlCur, the coil temperature target value decreases, the expansion valve opening increases, and the refrigerant flowing into increases;

In heating operation, if paraCtlTar>paraCtlCur, the coil temperature target value increases, the expansion valve opening increases, and the refrigerant flowing into increases.

(2) For an indoor unit with offset<0,

In cooling operation, if paraCtlTar>paraCtlCur, the coil temperature target value increases, the expansion valve opening decreases, and the refrigerant flowing into decreases;

In heating operation, if paraCtlTar<paraCtlCur, the coil temperature target value decreases, the expansion valve opening decreases, and the refrigerant flowing into decreases.

(3) For an indoor unit with offset=0, if paraCtlTar=paraCtlCur, the coil temperature target value is unchanged, the expansion valve opening degree is unchanged, and the refrigerant amount flowing is unchanged.

3. if the difference Δ≤the second set threshold, it means that the difference of the comfort degree deviation among the indoor units is negligible and the comfort degree of all indoor units is balanced. In order to maintain the stability of the multi-split system, it should keep refrigerant flowing into each of working indoor units unchanged, that is to say keep coil temperature target value unchanged and the opening degree of expansion valve unchanged.

The comfort degree balance control method disclosed by the present embodiment dynamically corrects target parameter of indoor units (the coil temperature target value) according to the difference Δ, the average comfort degree deviation and the comfort degree deviation of each indoor unit and adjusts the distribution of the refrigerant within the multi-split in real time so as to maintain the comfort degree of indoor units at a same level and ensure each of indoor units reach ideal state at the same time.

In the present embodiment, rationA and rationB are used to adjust the division of the deviation; if the difference Δ is high, the adjustment coefficient could be set as a larger value, if the difference Δ is lesser, the adjustment coefficient could be set as a smaller value, that is to say, rationB<rationA, so as to adjust the coil temperature target value based on the difference Δ thereby reducing the difference as soon as possible and avoid the instable operation of the multi-split system.

rationA: if the difference Δ>the first set threshold, it means that the difference is evident, in order to reduce the difference Δ as soon as possible and narrow down the gap between offsetMAX and offsetMIN, the value of rationA could be set larger. In the present embodiment, rationA belongs to the range [0.6, 1], within this range, rationA could speed up the reduction of the difference Δ and avoid the instability of multi-split operation.

rationB: if the second set threshold<the difference Δ≤the first set threshold, it means that the difference is not apparent, in order to maintain the stability of the multi-split system, the value of rationB could be set comparatively smaller so as to avoid fluctuations of the multi-split system.

In the present embodiment, rationB belongs to the range [0.1, 0.5] to ensure the stability of the multi-split system.

Accurate value range of rationA and rationB could be determined with experimental data from simulation tests, and accordingly the data may vary corresponding to different types of multi-split system. Normally the two parameters are stored in EEPROM and could be modified by PC software or controller.

Taking the heating operation as an example, a comfort degree balance control method is described in detail as follows, wherein the number of working indoor units N=8, the first set threshold is 10, the second set threshold is 5, rationA=0.8, and rationB=0.5.

TABLE I

| Indoor Unit Number | 1# | 2# | 3# | 4# | 5# | 6# | 7# | 8# |
| --- | --- | --- | --- | --- | --- | --- | --- | --- |
| Capacity HP | 1 | 2 | 3 | 2 | 3 | 5 | 2 | 1 |
| Target temperature setTemp | 20 | 25 | 26 | 24 | 27 | 24 | 22 | 25 |
| Real-time temperature curTemp | 14.8 | 14.2 | 17.8 | 14.2 | 16.5 | 18.1 | 16.4 | 17.3 |
| Comfort Degree Deviation offset | 26 | 43.2 | 31.5 | 40.8 | 38.9 | 24.6 | 25.5 | 30.8 |

TABLE I-continued

| Indoor Unit Number | 1# | 2# | 3# | 4# | 5# | 6# | 7# | 8# |
|---|---|---|---|---|---|---|---|---|
| Current Parameter paraCtlCur | 35 | 35 | 35 | 35 | 35 | 35 | 35 | 35 |
| Target Parameter paraCtlTar | 34.1 | 39.9 | 35 | 38 | 36.4 | 33 | 33.7 | 35 |

(1) The initial value of the current parameter paraCtlCur is set to 35, and the comfort degree deviation of each of indoor units is calculated according to the real-time ambient temperature and the target ambient temperature and is filled in Table I.

Taking the 3# indoor unit as an example, the comfort degree deviation offset=(26−17.8)*100/26=31.5.

(2) The maximum value is offsetMAX=43.2 and the minimum value is offsetMIN=24.6;

The difference Δ=offsetMAX−offsetMIN=43.2−24.6=18.6.

(3) The total capacity of working indoor units is SumHP=(1+2+3+2+3+5+2+1)=19.

offsetAVG=(26*1+43.2*2+31.5*3+40.8*2+38.9*3+24.6*5+25.5*2+30.8*1)/19=32.1.

(4) Since the difference Δ=18.6> the first set threshold, it is necessary to adjust the refrigerant amount flowing into the indoor unit.

For the 2#, 4#, and 5# indoor units with an offset>(32.1+5), it is necessary to increase the amount of refrigerant flowing into, that is to say, it is necessary to increase the target parameter (ie, the coil temperature target value) paraCtlTar.

Taking 2# indoor unit as an example, the calculation process is:

paraCtlTar=35+(43.2−32.1−5)*0.8=39.9; the calculation process of 4#, 5# indoor units are similar and will not be described repeatedly.

For the 1#, 6#, and 7# indoor units with an offset<(32.1−5), it is necessary to reduce the amount of refrigerant flowing into, that is to say, it is necessary to reduce the target parameter paraCtlTar.

Take 1# indoor unit as an example, the calculation process is:

paraCtlTar=35−(32.1−5−26)*0.8=34.1; the calculation process of 6#, 7# indoor units are similar and will not be described repeatedly.

For the 3# and 8# indoor units with an offset satisfying (32.1−5)≤offset≤(32.1+5), it is necessary to keep the refrigerant amount flowing into unchanged, that is to say, the target parameter paraCtlTar maintains unchanged.

Continuing the adjustment process, the parameters changed as shown in Table II:

TABLE II

| Indoor Unit Number | 1# | 2# | 3# | 4# | 5# | 6# | 7# | 8# |
|---|---|---|---|---|---|---|---|---|
| Capacity HP | 1 | 2 | 3 | 2 | 3 | 5 | 2 | 1 |
| Target temperature setTemp | 20 | 25 | 26 | 24 | 27 | 24 | 22 | 25 |
| Real-time temperature curTemp | 20.5 | 24.2 | 24.5 | 22.8 | 25.8 | 22.7 | 20.9 | 25.2 |
| Comfort Degree Deviation offset | −2.5 | 3.2 | 5.8 | 5 | 4.4 | 5.4 | 5 | −0.8 |
| Current Parameter paraCtlCur | 34.1 | 39.9 | 35 | 38 | 36.4 | 33 | 33.7 | 35 |
| Target Parameter paraCtlTar | 32.9 | 41.5 | 37.9 | 40.5 | 38.6 | 35.7 | 36.2 | 34.6 |

(1) Calculating the comfort degree deviation of each of indoor units according to the real-time ambient temperature and the target ambient temperature and filling in Table II.

(2) The maximum value is offsetMAX=5.8 and the minimum value is offsetMIN=−2.5;

The difference Δ=offsetMAX−offsetMIN=5.8−(−2.5)=8.3.

(3) If it satisfies the second set threshold value<difference Δ≤the first set threshold value, it is necessary to adjust the amount refrigerant flowing into indoor units.

For the 2#, 3#, 4#, 5#, 6#, and 7# indoor units with an offset>0, it is necessary to increase the amount of refrigerant flowing into, that is to say, it is necessary to increase the target parameter (ie, the coil temperature target value) paraCtlTar.

Taking 4# indoor unit as an example, the calculation process is:

paraCtlTar=38+5*0.5=40.5; the calculation process of 2#, 3#, 5#, 6#, 7# indoor units are similar and will not be described repeatedly.

For the 1# and 8# indoor units with an offset<0, it is necessary to reduce the amount of refrigerant flowing into, that is to say, the target parameterparaCtlTar needs to be reduced.

Taking 1# indoor unit as an example, the calculation process is:

paraCtlTar=34.1+(−2.5)*0.5=32.9, and the calculation process of 8# indoor unit is similar and will not be described repeatedly.

Continuing the adjustment process, the parameters changed as shown in Table III:

TABLE III

| Indoor Unit Number | 1# | 2# | 3# | 4# | 5# | 6# | 7# | 8# |
|---|---|---|---|---|---|---|---|---|
| Capacity HP | 1 | 2 | 3 | 2 | 3 | 5 | 2 | 1 |
| Target temperature setTemp | 20 | 25 | 26 | 24 | 27 | 24 | 22 | 25 |
| Real-time temperature curTemp | 20.5 | 24.8 | 25.5 | 24.3 | 26.8 | 23.5 | 22.2 | 25.5 |
| Comfort Degree Deviation offset | −2.5 | 0.8 | 1.9 | −1.3 | 0.7 | 2.1 | −0.9 | −2 |
| Current Parameter paraCtlCur | 32.9 | 41.5 | 37.9 | 40.5 | 38.6 | 35.7 | 36.2 | 34.6 |
| Target Parameter paraCtlTar | 32.9 | 41.5 | 37.9 | 40.5 | 38.6 | 35.7 | 36.2 | 34.6 |

(1) Calculating the comfort degree deviation of each of indoor units according to the real-time ambient temperature and the target ambient temperature and filling in Table III.

(2) The maximum value is offsetMAX=2.1, and the minimum value is offsetMIN=−2.5

The difference Δ=offsetMAX−offsetMIN= 2.1−(−2.5)=4.6;

Since the difference Δ<the second set threshold value, the refrigerant amount flowing into each of indoor units remains unchanged, that is to say, the target parameter of each of indoor units (ie, the coil temperature target value) remains unchanged.

According to Table I, Table II, Table III and the above-mentioned calculation process, the refrigerant amount flowing into is being adjusted according to the difference Δ, the average comfort degree deviation offsetAVG, and the comfort degree deviation of each of indoor units, so as to balance the performance of the multi-split system.

Figure 3:
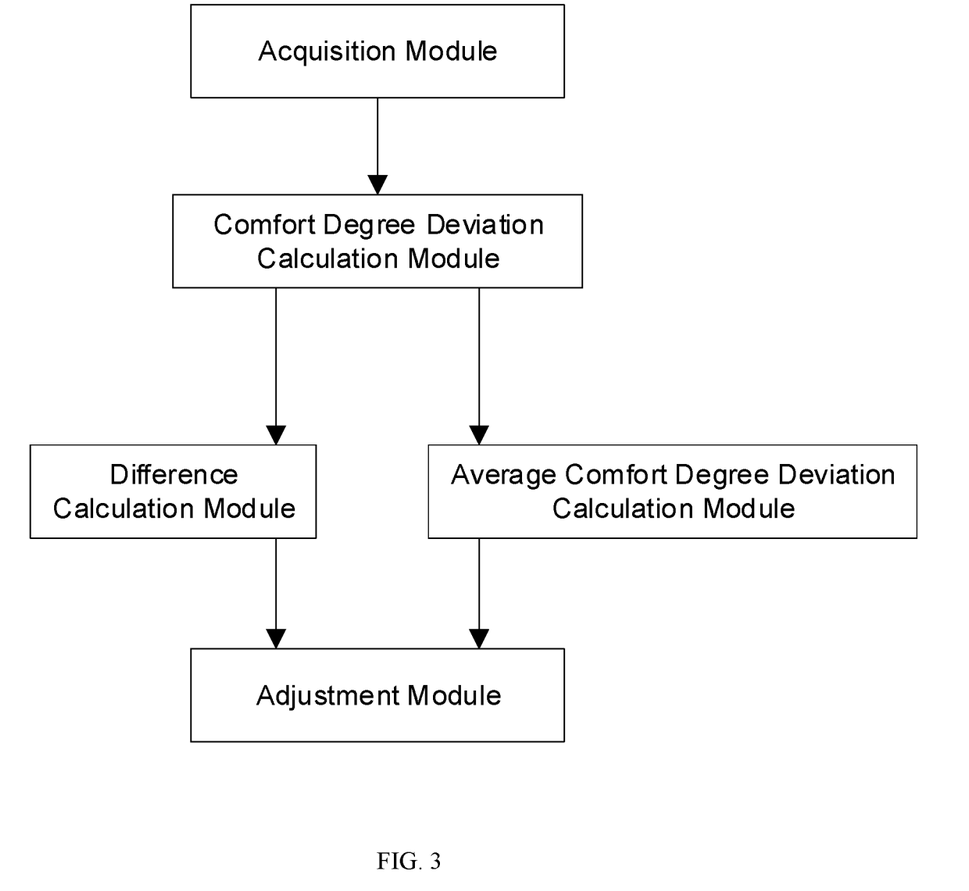
FIG. 3 is a function block diagram illustrating an electrical configuration of a comfort degree balance control system according to the present disclosure.

Based on the design of the comfort degree balance control method, a comfort degree balance control system for multi-split air conditioner is further provided, including an acquisition module, a comfort degree deviation calculation module, a difference calculation module, an average comfort degree deviation calculation module and an adjustment module, as shown in FIG. 3.

The acquisition module is configured to obtain a real-time ambient temperature and a target ambient temperature of each of rooms where an indoor unit provided in working.

The comfort degree deviation calculation module is configured to calculate a comfort degree deviation of each of the working indoor units and each of the comfort degree deviations is calculated by: in cooling operation, offset$i$=(curTemp$i$−setTemp$i$)*100/setTemp$i$;

in heating operation, offset$i$=(setTemp$i$−curTemp$i$)*100/setTemp$i$;

Wherein, offset$_i$ denotes the comfort degree deviation of working indoor unit i; curTempi denotes the real-time ambient temperature of working indoor unit i; and setTempi denotes the target ambient temperature of working indoor unit i; where i=1, 2, 3, . . . , N; N is the number of indoor units that are working.

The difference calculation module is configured to obtain a maximum value offsetMAX and a minimum value offsetMIN among the comfort degree deviations of working indoor units and calculate a difference Δ=offsetMAX−offsetMIN therebetween.

The average comfort degree deviation calculation module is configured to calculate the average comfort degree deviation $$offsetAVG = \left(\sum_{i=1}^{N}(offset_i * HP_i)\right) / SumHP,$$

wherein HPi denotes the capacity of i-th working indoor unit; SumHP denotes the sum of capacities of all working indoor units.

The adjustment module is configured to adjust the amount of refrigerant flowing into indoor units according to the difference Δ and the average comfort degree deviation.

The adjustment module is specifically configured to:

(1) adjust the coil temperature target value of indoor unit heat exchanger by increasing or decreasing the amount of refrigerant flowing into the indoor unit if the difference Δ>the first set threshold.

For an indoor unit with a comfort degree deviation> (offsetAVG+the second set threshold), the refrigerant amount flowing of the indoor unit is increased; the coil temperature target value is calculated by:

In cooling operation:

paraCtlTar=paraCtlCur−(offset−offsetAVG−the second set threshold)*ration$A$;

In heating operation:

paraCtlTar=paraCtlCur+(offset−offsetAVG−the second set threshold)*ration$A$.

For an indoor unit with a comfort degree deviation< (offsetAVG−the second set threshold), the refrigerant amount flowing of the indoor unit is reduced; the coil temperature target value is calculated by:

In cooling operation:

paraCtlTar=paraCtlCur+(offsetAVG−the second set threshold−offset)*ration$A$;

In heating operation:

paraCtlTar=paraCtlCur−(offsetAVG−the second set threshold−offset)*ration$A$.

For an indoor unit with a comfort degree deviation satisfying (offsetAVG−the second set threshold)≤the comfort degree deviation≤(offsetAVG+the second set threshold), the amount of refrigerant flowing into the indoor unit is kept constant, that is to say, the target value of the coil temperature is kept unchanged.

(2) adjust the coil temperature target value of indoor unit heat exchanger by increasing or decreasing the amount of refrigerant flowing into the indoor unit if the second set threshold value<difference Δ≤the first set threshold value;

For an indoor unit with a comfort degree deviation>0, to increase the amount of refrigerant flowing into the indoor unit;

For an indoor unit with a comfort degree deviation<0, to reduce the amount of refrigerant flowing into the indoor unit;

For an indoor unit with a comfort degree deviation=0, to keep the amount of refrigerant flowing into the indoor unit unchanged.

The coil temperature target value is calculated by:

In cooling operation:

paraCtlTar=paraCtlCur−offset*ration$B$;

In heating operation:

paraCtlTar=paraCtlCur+offset*ration$B$;

Wherein paraCtlTar denotes the coil temperature target value, paraCtlCur denotes a real-time coil temperature, offset is the comfort degree deviation of the indoor unit, and rationA and rationB are adjustment coefficients.

(3) keep the coil temperature target valve unchanged by keeping the amount of refrigerant flowing into each of working indoor units constant if the difference Δ≤the second set threshold, wherein the first set threshold>the second set threshold>0.

The working process of the comfort degree balance control system for multi-split air conditioner is described in detail in the above-mentioned embodiments of the comfort degree balance control method and will not be described repeatedly herein.

In general, the comfort degree balance control system for multi-split air conditioner disclosed the embodiment includes: obtaining a real-time ambient temperature and a target ambient temperature of each of rooms where an indoor unit provided is working; calculating a comfort degree deviation of each of the working indoor units; obtaining the maximum value offsetMAX and the minimum value offsetMIN among the comfort degree deviations of indoor units and calculating the difference Δ=offsetMAX−offsetMIN between the two; calculating an average comfort degree deviation; adjusting the amount of refrigerant flowing into working indoor units according to the difference Δ and the average comfort degree deviation, so as to reduce the difference Δ and balance the performance of the multi-split system.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A comfort degree balance control method for multi-split air conditioner comprising:

1) obtaining a real-time ambient temperature and a target ambient temperature of each of rooms where an indoor unit provided is working, and calculating a comfort degree deviation of each of working indoor units; in which each of comfort degree deviations is calculated by:

in cooling operation:

offset$_i$=(curTemp$_i$−setTemp$_i$)*100/setTemp$_i$ in heating operation:

offset$_i$=(setTemp$_i$−curTemp$_i$)*100/setTemp$_i$;

wherein offset$_i$ denoting the comfort degree deviation of working indoor unit i; curTempi denoting the real-time ambient temperature of working indoor unit i; and setTempi denoting the target ambient temperature of working indoor unit i; i=1, 2, 3, . . . , N; N denoting the number of indoor units that are working;

2) obtaining the maximum value offsetMAX and the minimum value offsetMIN among the comfort degree deviations of working indoor units and calculating the difference Δ=offsetMAX−offsetMIN between the two;

3) calculating an average comfort degree deviation $$offsetAVG = \left(\sum_{i=1}^{N}(offset_i * HP_i)\right) / SumHP;$$

wherein HPi denoting the capacity of i-th working indoor unit and SumHP denoting the sum of capacities of working indoor units; and 4) adjusting an amount of refrigerant flowing into working indoor units according to the difference Δ and the average comfort degree deviation.

2. The comfort degree balance control method according to claim 1, wherein:

the step 4) of adjusting the amount of refrigerant flowing into indoor units according to the difference Δ and the average comfort degree deviation, comprises:

(a) if the difference Δ>a first set threshold:

for an indoor unit with a comfort degree deviation> (offsetAVG+a second set threshold), increasing refrigerant flowing into the indoor unit;

for an indoor unit with a comfort degree deviation< (offsetAVG−the second set threshold), reducing refrigerant flowing into the indoor unit;

for an indoor unit with a comfort degree deviation satisfying (offsetAVG−the second set threshold)≤the comfort degree deviation≤(offsetAVG+the second set threshold), keeping the amount of refrigerant flowing into the indoor unit unchanged;

(b) if the second set threshold<the difference Δ≤the first set threshold:

for an indoor unit with a comfort degree deviation>0, increasing refrigerant flowing into the indoor unit;

for an indoor unit with a comfort degree deviation<0, reducing refrigerant flowing into the indoor unit;

for an indoor unit with a comfort degree deviation=0, keeping the amount of refrigerant flowing into the indoor unit unchanged;

(c) if the difference Δ≤the second set threshold, keeping refrigerant flowing into each of working indoor units unchanged;

wherein the first set threshold>the second set threshold>0.

3. The comfort degree balance control method according to claim 2, wherein:

in step (a), if the difference Δ>the first set threshold, the amount of refrigerant flowing into indoor units is being increased or decreased by adjusting coil temperature target value of heat exchangers within indoor units:

for an indoor unit with a comfort degree deviation> (offsetAVG+the second set threshold), a coil temperature target value being calculated by:

in cooling operation:

paraCtlTar=paraCtlCur−(offset−offsetAVG−the second set threshold)*ration$A$;

in heating operation:

$$paraCtlTar=paraCtlCur+(offset-offsetAVG-\text{the second set threshold})*rationA;$$

for an indoor unit with a comfort degree deviation< (offsetAVG−the second set threshold), a coil temperature target value being calculated by:

in cooling operation:

$$paraCtlTar=paraCtlCur+(offsetAVG-\text{the second set threshold}-offset)*rationA;$$

in heating operation:

$$paraCtlTar=paraCtlCur-(offsetAVG-\text{the second set threshold}-offset)*rationA;$$

wherein paraCtlTar denotes the coil temperature target value, paraCtlCur denotes a real-time coil temperature, offset is the comfort degree deviation of the indoor unit and rationA is the adjustment coefficient.

4. The comfort degree balance control method according to claim 3, wherein:
in step (b),
if the second set threshold value<the difference Δ≤the first set threshold value, the amount of refrigerant flowing into indoor units is increased or decreased by adjusting coil temperature target value of heat exchanger of indoor unit;

$$\text{in cooling operation: } paraCtlTar=paraCtlCur-offset*rationB;$$

$$\text{in heating operation: } paraCtlTar=paraCtlCur+offset*rationB;$$

wherein paraCtlTar denotes the coil temperature target value, paraCtlCur denotes a real-time coil temperature, offset is the comfort degree deviation of the indoor unit, and rationB is the adjustment coefficient.

5. The comfort degree balance control method according to claim 4, wherein:

$$rationB<rationA.$$

6. The comfort degree balance control method according to claim 3, wherein:
rationA is in the range of 0.6 to 1.

7. The comfort degree balance control method according to claim 4, wherein:
rationB is in the range of 0.1 to 0.5.

8. A comfort degree balance control system for multi-split air conditioner comprising:
an acquisition module configured to obtain a real-time ambient temperature and a target ambient temperature of each of rooms where an indoor unit provided in working;
a comfort degree deviation calculation module configured to calculate a comfort degree deviation of each of the working indoor units which is calculated by:
in cooling operation, $$offset_i=(curTemp_i-setTemp_i)*100/setTemp_i;$$

in heating operation, $$offset_i=(setTemp_i-curTemp_i)*100/setTemp_i;$$

wherein, $offset_i$, denotes the comfort degree deviation of working indoor unit i; $curTemp_i$ denotes the real-time ambient temperature of working indoor unit i; and $setTemp_i$ denotes the target ambient temperature of working indoor unit i; where i=1, 2, 3, . . . , N; N is the number of indoor units that are working;

a difference calculation module configured to obtain a maximum value offsetMAX and a minimum value offsetMIN among the comfort degree deviations of working indoor units and calculate a difference Δ=offsetMAX−offsetMIN therebetween;
an average comfort degree deviation calculation module configured to calculate an average comfort degree deviation $$offsetAVG = \left(\sum_{i=1}^{N}(offset_i * HP_i)\right) / SumHP,$$

wherein HPi denotes the capacity of i-th working indoor unit; SumHP denotes the sum of capacities of working indoor units; and
an adjustment module configured to adjust an amount of refrigerant flowing into indoor units according to the difference Δ and the average comfort degree deviation.

9. The comfort degree balance control system for multi-split air conditioner according to claim 8, wherein the adjustment module configured to:
if the difference Δ>the first set threshold:
for an indoor unit with a comfort degree deviation> (offsetAVG+the second set threshold), to increase the amount of refrigerant flowing into the indoor unit;
for an indoor unit with a comfort degree deviation< (offsetAVG−the second set threshold), to reduce the amount of refrigerant flowing into the indoor unit;
for an indoor unit with a comfort degree deviation satisfying (offsetAVG−the second set threshold)≤the comfort degree deviation≤(offsetAVG+the second set threshold), to keep the amount of refrigerant flowing into the indoor unit unchanged;
if the second set threshold value<difference Δ≤the first set threshold value;
for an indoor unit with a comfort degree deviation>0, to increase the amount of refrigerant flowing into the indoor unit;
for an indoor unit with a comfort degree deviation<0, to reduce the amount of refrigerant flowing into the indoor unit;
for an indoor unit with a comfort degree deviation=0, to keep the amount of refrigerant flowing into the indoor unit unchanged;
if the difference Δ≤the second set threshold, to keep the amount of refrigerant flowing into the indoor unit unchanged;
wherein the first set threshold>the second set threshold>0.

10. The comfort degree balance control system for multi-split air conditioner according to claim 9, wherein the adjustment module configured to:
adjust coil temperature target value of indoor unit heat exchanger by increasing or decreasing the amount of refrigerant flowing into the indoor unit if the difference Δ>the first set threshold;
for an indoor unit with a comfort degree deviation> (offsetAVG+the second set threshold), a coil temperature target value being calculated by:
in cooling operation:

$$paraCtlTar=paraCtlCur-(offset-offsetAVG-\text{the second set threshold})*rationA;$$

in heating operation:

$$paraCtlTar=paraCtlCur+(offset-offsetAVG-\text{the second set threshold})*rationA;$$

for an indoor unit with a comfort degree deviation<(offsetAVG−the second set threshold), a coil temperature target value is being calculated by:

in cooling operation:

paraCtlTar=paraCtlCur+(offsetAVG−the second set threshold-offset)*ration*A*;

in heating operation:

paraCtlTar=paraCtlCur−(offsetAVG−the second set threshold-offset)*ration*A*;

adjust coil temperature target value of indoor unit heat exchanger by increasing or decreasing the amount of refrigerant flowing into indoor unit if the second set threshold value<difference Δ≤the first set threshold value, wherein a coil temperature target value being calculated by:

in cooling operation:

paraCtlTar=paraCtlCur−offset*ration*B*;

in heating operation:

paraCtlTar=paraCtlCur+offset*ration*B*;

wherein paraCtlTar denotes the coil temperature target value, paraCtlCur denotes a real-time coil temperature, offset is the comfort degree deviation of the indoor unit, and rationA and rationB are adjustment coefficients.

\* \* \* \* \*